United States Patent
Aoyagi et al.

(10) Patent No.: US 8,712,417 B2
(45) Date of Patent: Apr. 29, 2014

(54) MOBILE COMMUNICATION METHOD, MOBILE STATION, AND NETWORK DEVICE

(75) Inventors: Kenichiro Aoyagi, Yokosuka (JP); Masafumi Masuda, Yokosuka (JP)

(73) Assignee: NTT DoCoMo, Inc., Tokyo (JP)

(*) Notice: Subject to any disclaimer, the term of this patent is extended or adjusted under 35 U.S.C. 154(b) by 0 days.

(21) Appl. No.: 13/132,771

(22) PCT Filed: Dec. 3, 2009

(86) PCT No.: PCT/JP2009/070306
§ 371 (c)(1),
(2), (4) Date: Aug. 16, 2011

(87) PCT Pub. No.: WO2010/064682
PCT Pub. Date: Jun. 10, 2010

(65) Prior Publication Data
US 2011/0287758 A1 Nov. 24, 2011

(30) Foreign Application Priority Data
Dec. 4, 2008 (JP) .................................. 2008-310000

(51) Int. Cl.
*H04W 36/00* (2009.01)

(52) U.S. Cl.
USPC ......... 455/437; 455/436; 455/550.1; 370/331

(58) Field of Classification Search
USPC ........................ 455/437, 436, 550.1; 370/331
See application file for complete search history.

(56) References Cited

U.S. PATENT DOCUMENTS

| | | | | |
|---|---|---|---|---|
| 2004/0002334 | A1* | 1/2004 | Lee et al. | 455/436 |
| 2004/0209593 | A1* | 10/2004 | Alberth et al. | 455/403 |
| 2007/0224988 | A1* | 9/2007 | Shaheen | 455/436 |

(Continued)

FOREIGN PATENT DOCUMENTS

| | | |
|---|---|---|
| CN | 101061740 A | 10/2007 |
| JP | 2007 531423 | 11/2007 |
| JP | 2008 211607 | 9/2008 |

OTHER PUBLICATIONS

3GPP TSG-RAN WG2 Meeting #58 bis, R2-072390, "Requirements for redirection in E-UTRAN," Nokia, Nokia Siemens Networks, Telecom Italia, T-Mobile, pp. 1-3 (Jun. 25-29, 2007).

(Continued)

*Primary Examiner* — Danh Le
(74) *Attorney, Agent, or Firm* — Oblon, Spivak, McClelland, Maier & Neustadt, L.L.P.

(57) ABSTRACT

A mobile communication method according to the present invention includes a step of a radio network controller of a first communication scheme transmitting an instruction signal to a mobile station UE in a case where a radio access capability of the mobile station UE is contained in the received connection setup request signal, the instruction signal instructing the mobile station UE to make an attempt to set up a connection in a cell of a second communication scheme, and a step of the mobile station UE setting up the connection in the cell of the second communication scheme in response to the received instruction signal, wherein in the mobile station UE transmits a connection setup request signal not containing the radio access capability of the mobile station UE, in a case where the mobile station UE detects the predetermined trigger but the attempt to setup the connection in the cell of the second communication scheme has been made a predetermined number of times or more within a predetermined period of time.

3 Claims, 3 Drawing Sheets

(56) References Cited

U.S. PATENT DOCUMENTS

2007/0230401 A1* 10/2007 Rayzman et al. ............. 370/331
2008/0240036 A1 10/2008 Liu et al.
2009/0111468 A1* 4/2009 Burgess et al. ............... 455/436
2010/0075716 A1* 3/2010 Chang et al. .................. 455/558

OTHER PUBLICATIONS

3GPP TSG-RAN-WG2 Meeting #63, R2-083929, "Introduction of Fast Redirection to LTE," NTT DoCoMo, pp. 1-13 (Aug. 18-22, 2008).

3GPP TS 25.331 V10.3.1, $3^{rd}$ Generation Partnership Project, Technical Specification Group Radio Acess Network, Radio Resource Control (RRC), Protocol specification, Release 10, pp. 1-1864 (Apr. 2011).

International Search Report issued Mar. 2, 2010 in PCT/JP09/70306 filed Dec. 3, 2009.

Japanese Office Action issued Nov. 13, 2012, in Patent Application No. 2008-310000 (with English-language translation).

Office Action issued Jun. 13, 2013 in Chinese Patent Application No. 200980148947.4 (with English language translation).

* cited by examiner

MOBILE COMMUNICATION METHOD, MOBILE STATION, AND NETWORK DEVICE

TECHNICAL FIELD

The present invention relates to a mobile communication method, a mobile station, and a network device.

BACKGROUND ART

WCDMA mobile communication systems use an established "RRC Connection Setup Procedure" in which, in an attempt to set up a connection in a specific cell, a mobile station UE transmits an "RRC Connection Request" to a network device (e.g., radio network controller RNC or the like) in a radio access network. The network device in turn secures a radio resource for the RRC connection and issues a notification to the mobile station UE so that the connection is set up.

Conventional WCDMA mobile communication systems use an established "Redirection Procedure" in which when a mobile station UE possessing capabilities to handle multiple communication schemes (Radio Access Technologies: RAT) such as the LTE (Long Term Evolution) scheme, the UMTS (Universal Mobile Telecommunications System) scheme, and the GSM (Global System for Mobile Communications) scheme transmits an "RRC Connection Request" to a cell of a first communication scheme (e.g., UMTS scheme), a network device of the first communication scheme (e.g., radio network controller RNC or the like) replies to the mobile station UE with an "RRC Connection Reject" so that an RRC connection is set up in a cell of a second communication scheme.

SUMMARY OF THE INVENTION

Problems to be Solved by the Invention

However, in the above "Redirection Procedure," the mobile station UE cannot set up the RRC connection in the cell of the second communication scheme when the cell of the second communication scheme is in a congested state, for example. This leads to a problem of possibly causing a "ping-pong phenomenon" in which the "RRC Connection Request" is repeatedly transmitted to the network device of the first communication scheme.

The present invention has been made in view of the above-mentioned problem, and an objective thereof is to provide a mobile communication method, a mobile station, and a network device that are capable of avoiding the above-mentioned "ping-pong phenomenon" in the "Redirection Procedure."

Means for Solving the Problems

The first feature of the present invention is summarized in that a mobile communication method including a step A of a mobile station transmitting a connection setup request signal containing a radio access capability of the mobile station to a network device of a first communication scheme, upon detecting a predetermined trigger while camping on in a cell of the first communication scheme, a step B of the network device of the first communication scheme transmitting an instruction signal to the mobile station in a case where the radio access capability of the mobile station is contained in the received connection setup request signal, the instruction signal instructing the mobile station to make an attempt to set up a connection in a cell of a second communication scheme, and a step C of the mobile station setting up the connection in the cell of the second communication scheme in response to the received instruction signal, wherein in the step A, the mobile station transmits a connection setup request signal not containing the radio access capability of the mobile station, in a case where the mobile station detects the predetermined trigger but the attempt to setup the connection in the cell of the second communication scheme has been made a predetermined number of times or more within a predetermined period of time.

The second feature of the present invention is summarized in that a mobile communication method including a step A of a mobile station transmitting a connection setup request signal containing a radio access capability of the mobile station to a network device of a first communication scheme, upon detecting a predetermined trigger while camping on in a cell of the first communication scheme, a step B of the network device of the first communication scheme transmitting an instruction signal to the mobile station in a case where the radio access capability of the mobile station is contained in the received connection setup request signal; the instruction signal instructing the mobile station to make an attempt to set up a connection in a cell of a second communication scheme, and a step C of the mobile station setting up the connection in the cell of the second communication scheme in response to the received instruction signal, wherein in the step A, the mobile station transmits a connection setup request signal not containing the radio access capability of the mobile station, in a case where the mobile station detects the predetermined trigger but access to the cell of the second communication scheme is restricted.

The third feature of the present invention is summarized in that a mobile station capable of communication in a cell of a first communication scheme and a cell of a second communication scheme, including a first connection setup unit configured to transmit a connection setup request signal containing a radio access capability of the mobile station to a network device of a first communication scheme, upon detecting a predetermined trigger while camping on in a cell of the first communication scheme, and a second connection setup unit configured to make an attempt to set up a connection in a cell of the second communication scheme in response to an instruction signal transmitted from the network device of the first communication scheme, wherein the instruction signal is a signal which the network device of the first communication scheme transmits to the mobile station in a case where the radio access capability of the mobile station is contained in the received connection setup request signal, and is a signal for instructing redirection to the second communication scheme, and the first connection setup unit is configured to transmit a connection setup request signal not containing the radio access capability of the mobile station, in a case where the first connection setup unit detects the predetermined trigger but the attempt to set up the connection in the cell of the second communication scheme has been made a predetermined number of times or more within a predetermined period of time.

The fourth feature of the present invention is summarized in that a mobile station capable of communication in a cell of a first communication scheme and a cell of a second communication scheme, including a first connection setup unit configured to transmit a connection setup request signal containing a radio access capability of the mobile station to a network device of a first communication scheme, upon detecting a predetermined trigger while camping on in a cell of the first communication scheme, and a second connection setup unit configured to make an attempt to set up a connection in a cell of the second communication scheme in response to an instruction signal transmitted from the network device of the first communication scheme, wherein the instruction signal is a signal which the network device of the first communication scheme transmits to the mobile station in a case where the radio access capability of the mobile station is contained in the received connection setup request signal, and is a signal for instructing redirection to the second communication scheme, and the first connection setup unit is configured to transmit a connection setup request signal not containing the radio access capability of the mobile station, in a case where the first connection setup unit detects the predetermined trigger but access to the cell of the second communication scheme is restricted.

The fifth feature of the present invention is summarized in that a network device of a first communication scheme, comprising an instruction signal transmission unit configured to transmit an instruction signal for instructing redirection to a second communication scheme for a mobile station camping on in a cell of the first communication scheme, in a case where a radio access capability of the mobile station is contained in a connection setup request signal received from the mobile station, wherein the instruction signal transmission unit is configured not to transmit the instruction signal to the mobile station, in a case where the radio access capability of the mobile station is contained in the received connection setup request signal but the instruction signal has been transmitted to the mobile station a predetermined number of times or more within a predetermined period of time.

The sixth feature of the present invention is summarized in that a network device of a first communication scheme, comprising an instruction signal transmission unit configured to transmit an instruction signal for instructing redirection to a second communication scheme for a mobile station camping on in a cell of the first communication scheme, in a case where a radio access capability of the mobile station is contained in a connection setup request signal received from the mobile station, wherein the instruction signal transmission unit is configured not to transmit the instruction signal to the mobile station, in a case where the radio access capability of the mobile station is contained in the received connection setup request signal but access to the cell of the second communication scheme is restricted.

Effect of the Invention

As described above, according to the present invention, it is possible to provide a mobile communication method, a mobile station, and a network device that are capable of avoiding the above-mentioned "ping-pong phenomenon" in the "Redirection Procedure".

MODES FOR CARRYING OUT THE INVENTION

Configuration of Mobile Communication System According to First Embodiment of Present Invention The configuration of a mobile communication system according to a first embodiment of the present invention will be described by referring to FIGS. 1 to 3.

Figure 1:
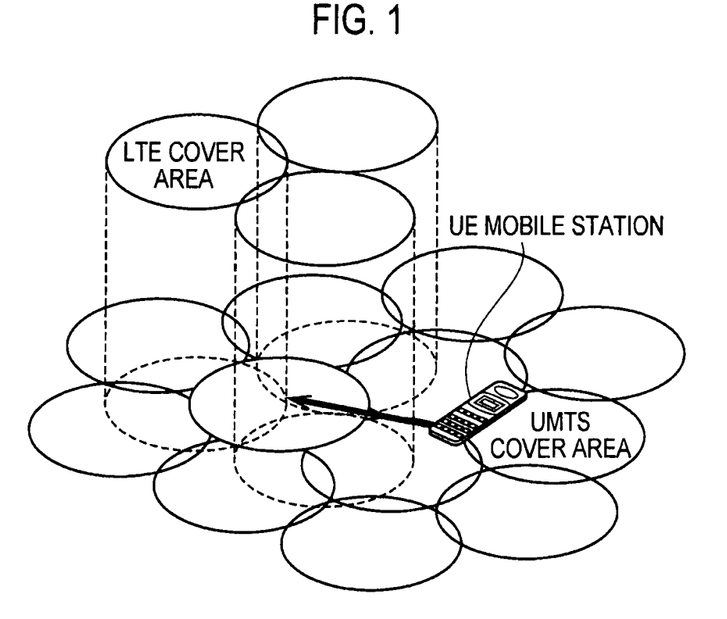
FIG. 1 is an overall configurational view of a mobile communication system according to a first embodiment of the present invention.

As shown in FIG. 1, the mobile communication system according to this embodiment includes a cover area formed of cells of the UMTS scheme (first communication scheme) and a cover area formed of cells of the LTE scheme (second communication scheme).

In the mobile communication system according to this embodiment, a mobile station UE is configured to camp on preferentially in a UMTS cell in view of the size of the cover area and the available communication services.

Figure 2:
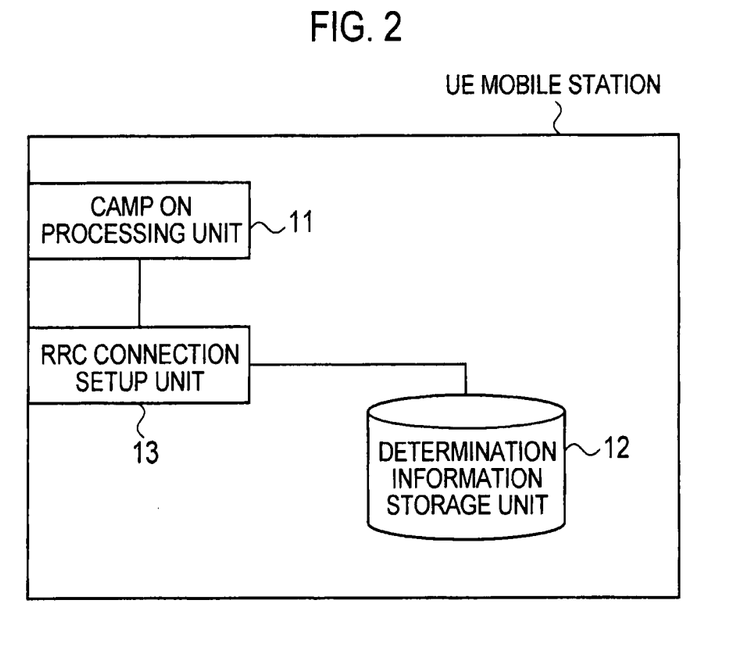
FIG. 2 is a functional block diagram of a mobile station according to the first embodiment of the present invention.

As shown in FIG. 2, the mobile station UE includes a camp on processing unit 11, a determination information storage unit 12, and an RRC connection setup unit 13.

The camp on processing unit 11 is configured to select a cell satisfying a predetermined condition and camp on in the selected cell. Here, the predetermined condition may be configured to be notified by a network device (e.g., exchange) at the time of a location registration processing.

The determination information storage unit 12 is configured to store determination information. Here, the determination information is information used when the RRC connection setup unit 13 determines whether or not to transmit an "RRC Connection Request (connection setup request signal)" containing "Inter-RAT capabilities (radio access capabilities of the mobile station UE)."

For example, the determination information storage unit 12 may be configured to store the number of attempts made within a predetermined period of time to set up an RRC connection in an LTE cell, access restriction information for an LTE cell, or the like as the determination information.

Here, if storing access restriction information for an LTE cell as the determination information, the determination information storage unit 12 may be configured to delete the access restriction information for the LTE cell after the elapse of a first predetermined period of time. Moreover, the determination information storage unit 12 may include a timer to count the time in which the access restriction information for the LTE cell is stored.

Meanwhile, the above-mentioned determination information may be notified within the UMTS cell by using a predetermined signal such as a broadcast signal. With such a configuration, the determination information can be made variable.

The RRC connection setup unit 13 is configured to set up an RRC connection with a radio network controller RNC being a network device of the UMTS scheme, or a radio station eNB being a network device of the LTE scheme.

Specifically, in a case where the camp on processing unit 11 is camping on in a UMTS cell, the RRC connection setup unit 13 is configured to transmit an "RRC Connection Request" to a radio network controller RNC to switch the RRC connection setup destination from the UMTS cell to an LTE cell.

Here, the RRC connection setup unit 13 is configured to transmit an "RRC Connection Request" containing "Inter-RAT capabilities" to the radio network controller RNC, upon detecting a predetermined trigger while the camp on processing unit 11 is camping on in the UMTS cell.

Here, conceivable predetermined triggers include start triggers for an outgoing processing and an incoming processing for a PS (packet switching) service and a CS (circuit switching) service, and the like.

Specifically, the RRC connection setup unit 13 is configured to transmit the "RRC Connection Request" containing the "Inter-RAT capabilities," upon detecting a start trigger for an ongoing processing for a PS service as the predetermined trigger while the camp on processing unit 11 is camping on in the UMTS cell.

Meanwhile, the RRC connection setup unit 13 may be configured to transmit an "RRC Connection Request" containing no "Inter-RAT capabilities," in a case where the RRC connection setup unit 13 detects the predetermined trigger while the camp on processing unit 11 is camping on in the UMTS cell but an attempt to set up a connection in the LTE cell has been made a predetermined number of times or more within the predetermined period of time.

Moreover, the RRC connection setup unit 13 may be configured to transmit the "RRC Connection Request" containing no "Inter-RAT capabilities," in a case where the RRC connection setup unit 13 detects the predetermined trigger while the camp on processing unit 11 is camping on in the UMTS cell but the access to the LTE cell is restricted.

Specifically, the RRC connection setup unit 13 may be configured to transmit the "RRC Connection Request" containing no "Inter-RAT capabilities," in a case where the RRC connection setup unit 13 detects the predetermined trigger while the camp on processing unit 11 is camping on in the UMTS cell but there exists the access restriction information for the LTE cell being stored even after the elapse of a second predetermined period of time.

Information of the above-mentioned predetermined period of time, the predetermined number of time, the first predetermined period of time, and the second predetermined period of time may be notified within the UMTS cell by using a predetermined signal such as a broadcast signal. With such a configuration, the information can be made variable.

Meanwhile, the RRC connection setup unit 13 may be configured to transmit the "RRC Connection Request" containing no "Inter-RAT capabilities," in a case where the RRC connection setup unit 13 detects the predetermined trigger while the camp on processing unit 11 is camping on in the UMTS cell but an attempt to set up a connection in the LTE cell is made the predetermined number of times or more within the predetermined period of time and the setup has been failed.

Figure 3:
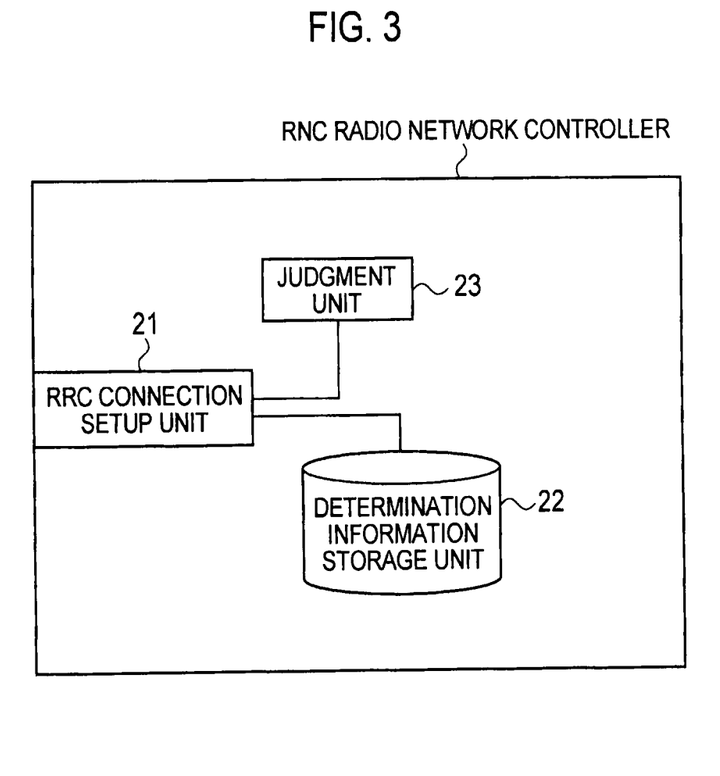
FIG. 3 is a functional block diagram of a radio network controller according to the first embodiment of the present invention.

As shown in FIG. 3, the radio network controller RNC includes an RRC connection setup unit 21, a determination information storage unit 22, and a judgment unit 23.

The RRC connection setup unit 21 is configured to set up an RRC connection with the mobile station UE in response to the "RRC Connection Request" transmitted from the mobile station UE.

The determination information storage unit 22 is configured to store determination information. Here, the determination information is information used when the RRC connection setup unit 21 determines whether or not to transmit an "RRC Connection Reject (instruction signal)" for instructing setup of an RRC connection in an LTE cell to the mobile station UE.

For example, the determination information storage unit 12 may be configured to store the number of times the "RRC Connection Reject" is transmitted to the mobile station UE within the predetermined period of time, the access restriction information for the LTE cell, or the like as the determination information.

The determination information may be configured to be notified to the mobile station UE camping on in the UMTS cell.

The judgment unit 23 is configured to judge whether or not the "Inter-RAT capabilities" are contained in the "RRC Connection Request" received from the mobile station UE camping on in the UMTS cell.

Then, if judging that the "Inter-RAT capabilities" are contained in the received "RRC Connection Request," the judgment unit 23 instructs the RRC connection setup unit 21 to transmit the "RRC Connection Reject."

Here, in a case where the "RRC Connection Request" transmitted from the mobile station UE is received but the above-mentioned instruction is issued from the judgment unit 23, i.e., the received "RRC Connection Request" is judged to contain the "Inter-RAT capabilities," the RRC connection setup unit 21 transmits the "RRC Connection Reject" to the mobile station UE so as to instruct it to set up an RRC connection in an LTE cell, i.e., to perform a "Redirection Procedure."

However, the RRC connection setup unit 21 may be configured to set up an RRC connection with the mobile station UE instead of transmitting the "RRC Connection Reject" to the mobile station, in a case where the "RRC Connection Request" received from the mobile station UE is judged to contain the "Inter-RAT capabilities" but it is judged as a result of referring to the determination information stored in the determination information storage unit 12 that the "RRC Connection Reject" has been transmitted to the mobile station UE the predetermined number of times or more within the predetermined period of time.

Moreover, the RRC connection setup unit 21 may be configured to set up an RRC connection with the mobile station UE instead of transmitting the "RRC Connection Reject" to the mobile station, in a case where the "RRC Connection Request" received from the mobile station UE is judged to contain the "Inter-RAT capabilities" but it is judged as a result of referring to the determination information stored in the determination information storage unit 12 that the access to the LTE cell is restricted.

Note that only the mobile station UE may include the determination information storage unit 12, or both the mobile station UE and the radio network controller RNC may include the determination information storage units 12 and 22.

Operation of Mobile Communication System
According to First Embodiment of Present Invention An operation of the mobile communication system according to the first embodiment of the present invention will be described by referring to FIG. 4.

Figure 4:
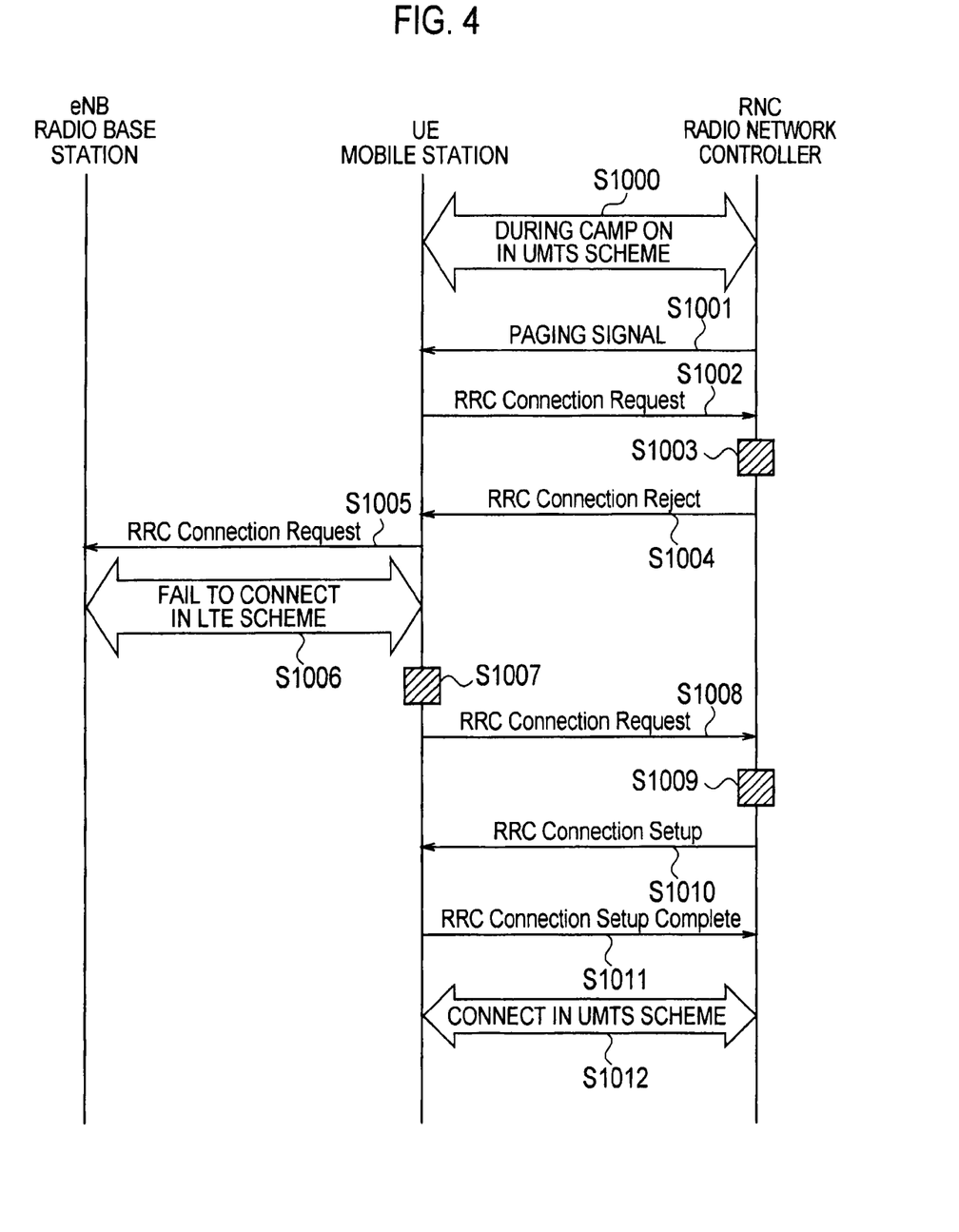
FIG. 4 is a sequence diagram showing an operation of the mobile communication system according to the first embodiment of the present invention.

As shown in FIG. 4, if a mobile station UE camping on in a UMTS cell in step S1000 receives a PS-service paging signal addressed to the mobile station UE from a radio network controller RNC in step S1001, the mobile station UE determines in step S1002 which one of an "RRC Connection Request" containing "Inter-RAT capabilities" and an "RRC Connection Request" containing no "Inter-RAT capabilities" should be transmitted to the radio network controller RNC.

Specifically, the mobile station UE determines which one of an "RRC Connection Request" containing "Inter-RAT capabilities" and an "RRC Connection Request" containing no "Inter-RAT capabilities" should be transmitted, on the basis of whether or not an attempt to set up a connection in an LTE cell has been made the predetermined number of times or more within the predetermined period of time.

In the example in FIG. 4, in step S1002, the mobile station UE determines that an attempt to set up a connection in the LTE cell has not been made the predetermined number of times or more within the predetermined period of time, and transmits an "RRC Connection Request" containing "Inter-RAT capabilities" to the radio network controller RNC.

In step S1003, based on whether or not the received "RRC Connection Request" contains the "Inter-RAT capabilities" and also on the above-mentioned determination information, the radio network controller RNC judges whether to set up an RRC connection or to transmit the above-mentioned "RRC Connection Reject."

In the example in FIG. 4, in step S1003, the radio network controller RNC determines that the received "RRC Connection Request" contains the "Inter-RAT capabilities" and that the "RRC Connection Reject" has not been transmitted to the mobile station UE the predetermined number of times or more within the predetermined period of time. Then, in step S1004, the radio network controller RNC transmits the "RRC Connection Reject" to the mobile station UE.

In step S1005, the mobile station UE transmits an "RRC Connection Request" to a radio base station eNB in an attempt to set up an RRC connection in the LTE cell.

Here, in step S1006, the setup of an RRC connection in the LTE cell happens to fail. Then, in step S1007, the mobile station UE again determines which one of the "RRC Connection Request" containing the "Inter-RAT capabilities" and the "RRC Connection Request" containing no "Inter-RAT capabilities" should be transmitted to the radio network controller RNC.

In the example in FIG. 4, in step S1007, the mobile station UE determines that an attempt to set up a connection in the LTE cell has been made the predetermined number of times within the predetermined period of time. Then, in step S1008, the mobile station UE transmits the "RRC Connection Request" containing no "Inter-RAT capabilities" to the radio network controller RNC.

In step S1009, based on whether or not the received "RRC Connection Request" contains the "Inter-RAT capabilities" and also on the above-mentioned determination information, the radio network controller RNC judges whether to set up an RRC connection or to transmit the above-mentioned "RRC Connection Reject."

In the example in FIG. 4, in step S1009, the radio network controller RNC determines that the received "RRC Connection Request" contains no "Inter-RAT capabilities." Then, in step S1010, the radio network controller RNC transmits an "RRC Connection Setup" to the mobile station UE.

In step S1011, the mobile station UE transmits an "RRC Connection Setup Complete" to the radio network controller RNC.

As a result, in step S1012, the mobile station UE completes the setup of a connection in the LTE cell and transitions to a connected state.

Advantageous Effects of Mobile Communication System According to First Embodiment of Present Invention According to the mobile communication system according to the first embodiment of the present invention, the configuration is such that when a mobile station UE camping on in a UMTS cell determines that it has made an attempt to set up a connection in an LTE cell the predetermined number of times within the predetermined period of time, the mobile station UE transmits the "RRC Connection Request" containing no "Inter-RAT capabilities" to a radio network controller RNC.

If the received "RRC Connection Request" contains the "Inter-RAT capabilities," the radio network controller RNC sets up an RRC connection with the mobile station UE instead of performing the "Redirection Procedure." Accordingly, it is possible avoid the occurrence of the "ping-pong phenomenon" in the "Redirection Procedure."

Moreover, according to the mobile communication system according to the first embodiment of the present invention, the configuration is such that when the mobile station UE camping on in the UMTS cell determines that the access to the LTE cell is restricted, the mobile station UE transmits the "RRC Connection Request" containing no "Inter-RAT capabilities" to the radio network controller RNC. If the received "RRC Connection Request" contains the "Inter-RAT capabilities," the radio network controller RNC sets up an RRC connection with the mobile station UE instead of performing the "Redirection Procedure." Accordingly, it is possible avoid the occurrence of the "ping-pong phenomenon" in the "Redirection Procedure."

Further, according to the mobile communication system according to the first embodiment of the present invention, the configuration is such that the radio network controller RNC sets up an RRC connection with the mobile station UE camping on in the UMTS cell instead of performing the "Redirection Procedure," in a case where the "RRC Connection Request" received from the mobile station UE contains the "Inter-RAT capabilities" but the "RRC Connection Reject" has been transmitted to the mobile station UE the predetermined number of times within the predetermined period of time. Accordingly, it is possible avoid the occurrence of the "ping-pong phenomenon" in the "Redirection Procedure."

Further, according to the mobile communication system according to the first embodiment of the present invention, the configuration is such that the radio network controller RNC sets up an RRC connection with the mobile station UE camping on in the UMTS cell instead of performing the "Redirection Procedure," in a case where the "RRC Connection Request" received from the mobile station UE contains the "Inter-RAT capabilities" but the mobile station UE determines that the access to the LTE cell is restricted. Accordingly, it is possible avoid the occurrence of the "ping-pong phenomenon" in the "Redirection Procedure."

The above-mentioned features of this embodiment may be expressed as below.

A first feature of this embodiment is a mobile communication method summarized as including: a step A (step S1002) of a mobile station UE transmitting an "RRC Connection Request (connection setup request signal)" containing "Inter-RAT capabilities (radio access capabilities of the mobile station UE)" to a radio network controller RNC (network device of the UMTS scheme (first communication scheme)), upon detecting a predetermined trigger while camping on in a cell of the UMTS scheme; a step B (steps S1003 and S1004) of the radio network controller RNC transmitting an "RRC Connection Reject (instruction signal)" for instructing setup of an RRC connection in a cell of the LTE scheme (second communication scheme) to the mobile station UE, in a case where the "Inter-RAT capabilities" are contained in the received "RRC Connection Request;" and a step C (steps S1005 and S1006) of the mobile station UE making an attempt to set up the RRC connection in the LTE cell in response to the received "RRC Connection Request." In addition, in the step A (step S1002), the mobile station UE transmits an "RRC Connection Request" containing no "Inter-RAT capabilities," in a case where the mobile station UE detects the predetermined trigger but the attempt to setup the connection in the LTE cell has been made a predetermined number of times or more within a predetermined period of time.

A second feature of this embodiment is a mobile communication method summarized as including: a step A (step S1002) of a mobile station UE transmitting an "RRC Connection Request" containing "Inter-RAT capabilities" to a radio network controller RNC, upon detecting a predetermined trigger while camping on in a cell of the UMTS scheme; a step B (steps S1003 and S1004) of the radio network controller RNC transmitting an "RRC Connection Reject (instruction signal)" for instructing setup of an RRC connection in a cell of the LTE scheme (second communication scheme) to the mobile station UE, in a case where the "Inter-RAT capabilities" are contained in the received "RRC Connection Request;" and a step C (steps S1005 and S1006) of the mobile station UE making an attempt to set up the RRC connection in the LTE cell in response to the received "RRC Connection Request." In addition, in the step A (step S1002), the mobile station UE transmits an "RRC Connection Request" containing no "Inter-RAT capabilities," in a case where the mobile station detects the predetermined trigger but access to the LTE cell is restricted.

A third feature of this embodiment is a mobile station UE capable of communication in a cell of the UMTS scheme and a cell of the LTE scheme, summarized as including an RRC connection setup unit 13 configured to transmit an "RRC Connection Request" containing "Inter-RAT capabilities" to a radio network controller RNC, upon detecting a predetermined trigger while camping on in a UMTS cell, and also configured to make an attempt to set up an RRC connection in an LTE cell in response to an "RRC Connection Reject" transmitted from the radio network controller RNC. In addition, the "RRC Connection Reject" is a signal which the radio network controller RNC transmits to the mobile station UE in a case where the "Inter-RAT capabilities" are contained in the received "RRC Connection Request," and is a signal for instructing setup of the RRC connection in the LTE cell. Moreover, the RRC connection setup unit 13 is configured to transmit an "RRC Connection Request" containing no "Inter-RAT capabilities," in a case where the RRC connection setup unit 13 detects the predetermined trigger but the attempt to set up the RRC connection in the LTE cell has been made a predetermined number of times or more within a predetermined period of time.

A fourth feature of this embodiment is a mobile station UE capable of communication in a cell of the UMTS scheme and a cell of the LTE scheme, summarized as including a RRC connection setup unit 13 configured to transmit an "RRC Connection Request" containing "Inter-RAT capabilities" to a radio network controller RNC, upon detecting a predetermined trigger while camping on in a UMTS cell, and also configured to make an attempt to set up an RRC connection in an LTE cell in response to an "RRC Connection Reject" transmitted from the radio network controller RNC. In addition, the "RRC Connection Reject" is a signal which the radio network controller RNC transmits to the mobile station UE in a case where the "Inter-RAT capabilities" are contained in the received "RRC Connection Request," and is a signal for instructing setup of the RRC connection in the LTE cell. Moreover, the RRC connection setup unit 13 is configured to transmit an "RRC Connection Request" containing no "Inter-RAT capabilities," in a case where the RRC connection setup unit 13 detects the predetermined trigger but access to the LTE cell is restricted.

A fifth feature of this embodiment is a radio network controller RNC summarized as including an RRC connection setup unit 21 (instruction signal transmission unit) configured to transmit an "RRC Connection Reject" for instructing setup of an RRC connection in a cell of the LTE scheme to a mobile station UE camping on in a cell of the UMTS scheme, in a case where "Inter-RAT capabilities" are contained in an "RRC Connection Request" received from the mobile station UE. In addition, the RRC connection setup unit 21 is configured not to transmit the "RRC Connection Reject" to the mobile station, in a case where the "Inter-RAT capabilities" are contained in the received "RRC Connection Request" but the "RRC Connection Reject" has been transmitted to the mobile station UE a predetermined number of times or more within a predetermined period of time.

A sixth feature of this embodiment is a radio network controller RNC summarized as including an RRC connection setup unit 21 (instruction signal transmission unit) configured to transmit an "RRC Connection Reject" for instructing setup of an RRC connection in a cell of the LTE cell to a mobile station UE camping on in a cell of the UMTS scheme, in a case where "Inter-RAT capabilities" are contained in an "RRC Connection Request" received from the mobile station UE. In addition, the RRC connection setup unit 21 is configured not to transmit the "RRC Connection Reject" to the mobile station, in a case where the "Inter-RAT capabilities" are contained in the received "RRC Connection Request" but access to the LTE cell is restricted.

Note that operation of the above described mobile station UE, radio base station eNB and radio network controller RNC may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE, radio base station eNB and radio network controller RNC. Also, the storage medium and the processor may be provided in the mobile station UE, radio base station eNB and radio network controller RNC as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication method comprising:
   a step A of a mobile station transmitting a connection setup request signal containing a radio access capability of the mobile station to a network device of a first communication scheme, upon detecting a predetermined trigger while camping on in a cell of the first communication scheme;
   a step B of the network device of the first communication scheme transmitting an instruction signal to the mobile station in a case where the radio access capability of the mobile station is contained in the received connection setup request signal; the instruction signal instructing the mobile station to make an attempt to set up a connection in a cell of a second communication scheme; and a step C of the mobile station setting up the connection in the cell of the second communication scheme in response to the received instruction signal, wherein in the step A, the mobile station transmits a connection setup request signal not containing the radio access capability of the mobile station, in a case where the mobile station detects the predetermined trigger but the attempt to setup the connection in the cell of the second communication scheme has been made a predetermined number of times or more within a predetermined period of time.

2. A mobile station capable of communication in a cell of a first communication scheme and a cell of a second communication scheme, comprising:

circuitry configured to:

transmit a connection setup request signal containing a radio access capability of the mobile station to a network device of a first communication scheme, upon detecting a predetermined trigger while camping on in a cell of the first communication scheme; and make an attempt to set up a connection in a cell of the second communication scheme in response to an instruction signal transmitted from the network device of the first communication scheme, wherein the instruction signal is a signal which the network device of the first communication scheme transmits to the mobile station in a case where the radio access capability of the mobile station is contained in the received connection setup request signal, and is a signal for instructing redirection to the second communication scheme, and the circuitry is configured to transmit a connection setup request signal not containing the radio access capability of the mobile station, in a case where the predetermined trigger is detected but the attempt to set up the connection in the cell of the second communication scheme has been made a predetermined number of times or more within a predetermined period of time.

3. A network device of a first communication scheme, comprising:

circuitry configured to:

transmit an instruction signal for instructing redirection to a second communication scheme for a mobile station camping on in a cell of the first communication scheme, in a case where a radio access capability of the mobile station is contained in a connection setup request signal received from the mobile station; and not to transmit the instruction signal to the mobile station, in a case where the radio access capability of the mobile station is contained in the received connection setup request signal but the instruction signal has been transmitted to the mobile station a predetermined number of times or more within a predetermined period of time, wherein the network device does not receive, from the mobile station, the connection setup request signal unless the mobile station receives the instruction signal from the network device.

* * * * *